(12) United States Patent
Ingraham et al.

(10) Patent No.: US 7,500,451 B2
(45) Date of Patent: Mar. 10, 2009

(54) BIRD DETERRENT APPARATUS

(76) Inventors: Christopher Alan Ingraham, 705 Klem Rd., Webster, NY (US) 14580; Lynn T. Ingraham, 705 Klem Rd., Webster, NY (US) 14580

( * ) Notice: Subject to any disclaimer, the term of this patent is extended or adjusted under 35 U.S.C. 154(b) by 0 days.

(21) Appl. No.: 12/054,435

(22) Filed: Mar. 25, 2008

(65) Prior Publication Data
US 2008/0163828 A1    Jul. 10, 2008

Related U.S. Application Data

(63) Continuation of application No. 11/293,779, filed on Dec. 1, 2005, now abandoned.

(60) Provisional application No. 60/632,901, filed on Dec. 3, 2004.

(51) Int. Cl.
*A01K 37/00* (2006.01)
*B68B 17/00* (2006.01)
*E04B 1/72* (2006.01)
*A01M 29/00* (2006.01)

(52) U.S. Cl. .......................... 119/713; 114/343; 52/101; 43/124

(58) Field of Classification Search ................. 119/712, 119/713; 52/101; 114/343, 255; 43/1, 124
See application file for complete search history.

(56) References Cited

U.S. PATENT DOCUMENTS

| 675,043 | A | * | 5/1901 | Hornback | 211/119.02 |
| 4,602,764 | A | * | 7/1986 | Cacicedo | 256/11 |
| 4,796,566 | A | * | 1/1989 | Daniels | 119/789 |
| 6,622,436 | B1 | * | 9/2003 | Kretsch | 52/101 |
| 6,904,872 | B2 | * | 6/2005 | Muller | 119/796 |

* cited by examiner

*Primary Examiner*—Son T. Nguyen (57) ABSTRACT

A bird deterrent apparatus for preventing birds from landing near a location to be protected, such as, but not limited to, a boat. The bird deterrent apparatus is easy to install and remove, and does not interfere with the normal use of the location. The bird deterrent apparatus comprises a line retractor, a retractable barrier line, and associated hardware and barrier line guides to secure the line retractor and the barrier line to structural elements in proximity to the location to be protected from perching birds and their associated debris.

10 Claims, 10 Drawing Sheets

BIRD DETERRENT APPARATUS

CROSS-REFERENCE TO RELATED PATENT APPLICATIONS

This application is a continuation of applicants' co-pending patent application U.S. Ser. No. 11/293,779, filed on Dec. 1, 2005, which claims priority from U.S. provisional patent application U.S. Ser. No. 60/632,901 filed on Dec. 3, 2004. The entire disclosure of each of these patent applications is hereby incorporated by reference into this specification.

BACKGROUND OF THE INVENTION

1. Field of the Invention

This invention relates generally to animal deterrent devices, and more particularly to an apparatus for deterring birds from landing near a location to be protected, such as, but not limited to, a boat.

2. Description of the Related Art

The related art has disclosed various devices for deterring birds from landing. Reference may be had, e.g., to U.S. Pat. No. 6,082,285 entitled "Sea Bird Marine Craft Protector". This patent discloses a net-like device that covers a boat to prevent sea birds from landing on the boat. The device is custom sized to the boat that it is designed to protect, and requires a plurality of support rods to hold the net above the surface of the boat. The device may also contain a reel for letting out and winding up the protector net. The device may also require the addition of support rods to hold the netting above the boat's structure. In addition, the netting is affixed to the rail of the boat, and as such, is not able to protect the boat rails and periphery of the boat from birds.

Reference may further be had to U.S. Pat. No. 5,476,062 entitled "Seagull Guard". This patent discloses a device that prevents birds from flying near and landing on a boat by using a post centrally mounted on a boat, with a series of cables extending from the top of the post to peripheral points on the boat. Although the device may be practical on a motorboat, it would be difficult to install on a sailboat due to masts, booms, and other hardware associated with a sailboat. In addition, this device will not protect a boat's periphery nor will the device be effective in deterring smaller birds due to the large spacing between cables. In addition, the device may require deck or hull modifications to accommodate the support pole.

U.S. Pat. No. 5,341,759 entitled "Sea Bird Deterrent For Boats and Navigation Aids" discloses a device for deterring birds from landing that includes at least two posts with line extending between the posts. The device disclosed in the patent is intended to be used as a permanent installation on the top of a boat or buoy, and is designed to protect the top surface of the boat or buoy.

In U.S. Pat. No. 5,845,607 entitled "Bird deterrent apparatus for Protection of a Body of Water", there is disclosed a device for protecting a body of water from birds by using a series of wires permanently installed over the surface of a body of water.

U.S. Pat. No. 5,713,160 entitled "Retractable Bird deterrent apparatus" discloses a device used on buildings and ledges for deterring birds from landing. The device retracts through folding mounting brackets and supports. A wire barrier contained between the mounting brackets and supports remains in place, along with the permanently installed mounting brackets and supports.

U.S. Pat. No. 6,418,674 entitled "Bird Repellant Method and System" also discloses a line barrier bird deterrent system that is permanently installed, and not easily removed or moved out of the way. The system disclosed in the patent is often times used on buildings and ledges.

In U.S. Pat. No. 5,092,088 entitled "Bird deterrent apparatus", a permanently attached set of supports and wires is disclosed that deters birds from roosting or nesting on building ledges and the like.

The bird deterrent devices of the related art are generally permanent or require a significant amount of time to remove and subsequently replace. Many boats, and in particular sailboats, require the deck and associated rigging to be free of items that may either interfere with the proper functioning of the boat or that may create a hazardous condition through entanglement with rigging or sailors.

The bird deterrent devices of the related art also do not protect the boat's periphery, such as rails and lifelines, from birds and their associated debris.

Several of the bird deterrent devices of the related art, for example U.S. Pat. Nos. 5,476,062 and 6,082,285 are designed primarily for use with power boats. These devices may not be practical to install and remove from a sailboat due to the placement of masts, booms, and other hardware on a sailboat.

It is an object of the present invention to provide a bird deterrent apparatus that can be easily installed on any location, including all boats, and in particular sailboats, and is easy to remove and store when the location is in use.

It is another object of the present invention to provide a bird deterrent apparatus that protects all parts of the boat, including the boat's periphery, from birds and their associated debris.

It is another object of the present invention to provide a bird deterrent apparatus that is self-stowing, and can be retracted and stowed in a compact manner while the location is in use.

It is a further object of the present invention to provide a bird deterrent apparatus that conforms to the lines and symmetry of a boat, and in particular a sailboat, and is aesthetically pleasing and in harmony with the design of a boat, and in particular a sailboat.

BRIEF SUMMARY OF THE INVENTION

In accordance with the present invention, there is provided a bird deterrent apparatus comprising a barrier line for preventing birds from landing near a location to be protected from said birds, a line retractor having a line spool for storing and delivering said barrier line, a line retractor spring for tensioning and retracting said barrier line, said line retractor spring operatively connected to said line spool, and a rail clamp attached to said line retractor for mounting and demounting said line retractor on a structural element.

The bird deterrent apparatus of the present invention is easily retracted and stowed so as not to interfere with the use of a location such as the deck of a boat. The bird deterrent apparatus of the present invention, when used on a boat, protects all parts of a boat, including the boat's periphery, from birds and their associated debris. The bird deterrent apparatus may be used to protect any location from birds, and is not just limited to boats. Such locations may include, but are not limited to, outside decks, outside dining tables and bars, swim platforms, docks, and any other location where the landing, perching or habitation by birds is undesirable. When used on a boat, the bird deterrent apparatus of the present invention conforms to the lines and symmetry of a boat, and in particular a sailboat, and is aesthetically pleasing and in harmony with the design of a boat, and in particular the aesthetics of a sailboat. When retracted, the bird deterrent apparatus of the present invention is unobtrusively mounted to a rail, mast, boom or other part of the boat that requires protection from birds and their associated debris. To use the bird deterrent apparatus of the present invention, a barrier line is deployed from the line retractor and attached to a terminating point. The barrier line may be held in place with line guides to keep long lengths of barrier line in place. To remove the bird deterrent apparatus of the present invention, the barrier line is simply retracted into the line retractor. The ease at which the bird deterrent apparatus of the present invention is placed in use and removed from use makes it ideal for sailboats and other recreational boats where the boat owner desires to optimize the time that is spent using the boat, and further desires to minimize the time that is spent maintaining the boat and preparing the boat for use. The bird deterrent apparatus is also ideal for locations where it is desirable to exclude birds, but where it is desirable for the bird deterrent apparatus to be removed while the location is in use. Examples of such locations include, but are not limited to, outside decks, outside dining areas, outside bars, swim platforms, docks, and boathouses.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings, and the appended claims.

DESCRIPTION OF THE PREFERRED EMBODIMENTS

For a general understanding of the present invention, reference is made to the drawings. In the drawings, like reference numerals have been used throughout to designate identical elements.

Figure 1:
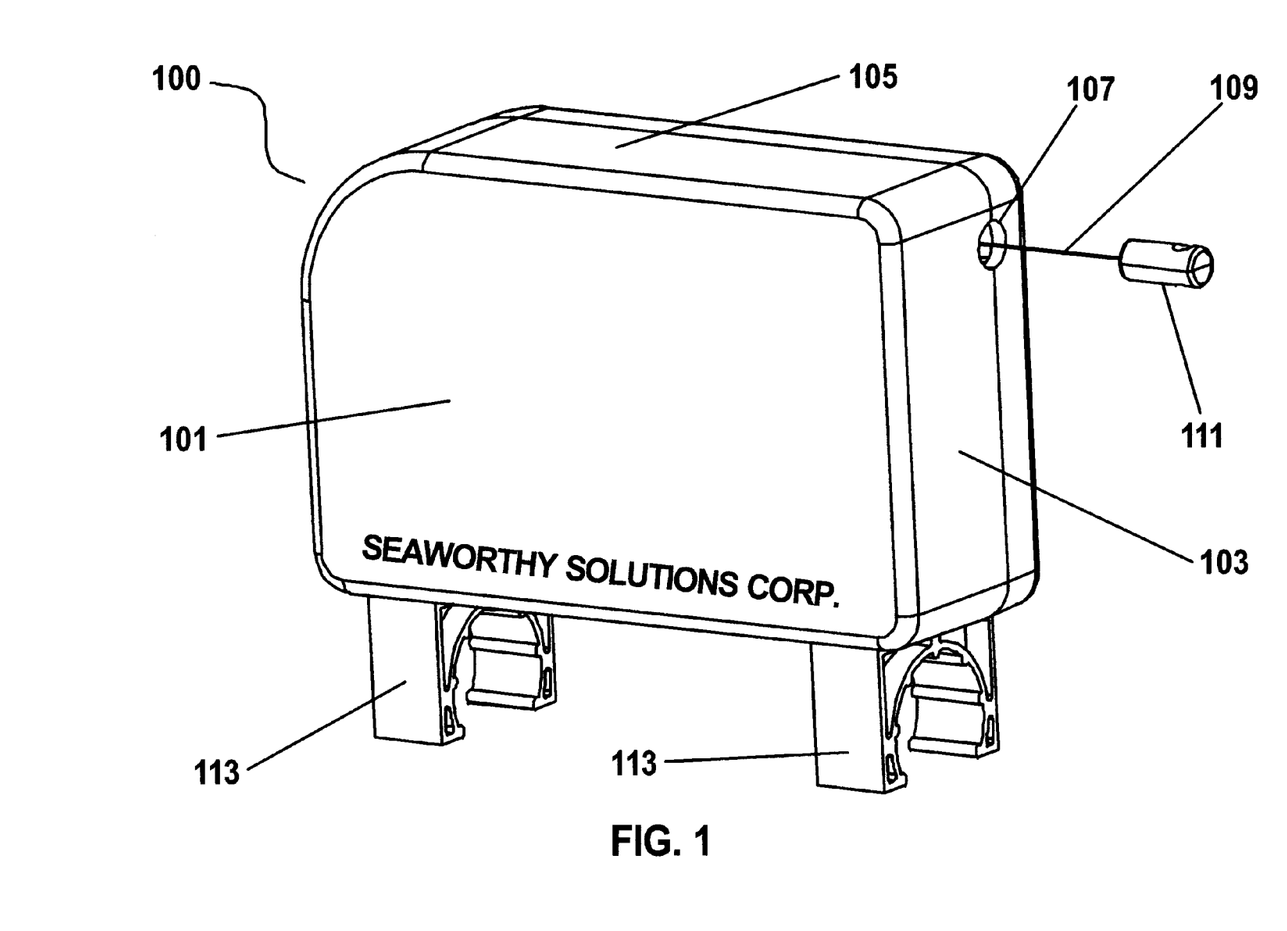
FIG. 1 is a perspective view from the first side of a line retractor.

Referring to FIG. 1, a perspective view from the first side of a line retractor 100 according to one embodiment of the present invention is shown. The line retractor 100 allows one to temporarily extend a length of line in close proximity above a potential bird perching location. As is known to one skilled in the art, a line placed in close proximity above a potential bird perching location deters birds from perching. It is speculated that the line not only prevents a bird from perching, but also confuses and alarms the prospective perching bird when they encounter the line. Using the line retractor 100 allows one to deploy such a line when needed, and retract and remove such a line when it is not desirable to have the line in place. Various guide assemblies, as will be described later in this specification, may also be used to assist with the proper placement and retention of such as line, referred to herein as a barrier line 109. The line retractor 100 may be made of plastic, stainless steel, brass, or the like. The line retractor 100 may be mounted to various parts of a floating vessel, such as the stern rail of a sailboat, using rail clamps 113 that are attached to said line retractor 100. The line retractor 100 may contain one or more rail clamps 113. The rail clamps 113 may be shaped to accommodate the point of attachment, and may be made of a plastic, a metal, or a composite. For example, the rail clamps 113 may be shaped as a circle to accommodate a round rail such as a stern rail of a sailboat. The rail clamps 113 may also, in some embodiments of the present invention, contain a tightening mechanism such as a threaded screw, a worm gear, a ratcheting lever, or the like. The line retractor 100 also contains an internal spool, a spring mechanism, and other mechanical elements that are illustrated clearly and further explained by way of FIG. 2. The line retractor 100 may have a faceplate side 101. The faceplate side 101 protects the internal mechanism of the line retractor 100, and may also be used to provide advertising, such as the name of the manufacturer of the invention. The faceplate side 101 made be made from a plastic, a metal, or a composite. The line retractor 100 may also have a perimeter side 103 and a top side 105 to further protect the internal mechanism of the line retractor 100. The perimeter side 103 and the top side 105 may be made from a plastic, a metal, or a composite. The internal mechanism of the line retractor 100 contains barrier line 109 that may be made of monofilament line, nylon line, gel spun polyethylene fibers, metal wire, or the like. The barrier line 109 exits the line retractor 100 through a barrier line guide hole 107. The barrier line guide hole 107 prevents the barrier line 109 from becoming entangled or fouled in the internal mechanism of the line retractor 100 while the barrier line 109 is being deployed or retracted. The terminating end of the barrier line 109 may contain a barrier line retainer 111 that allows one to fasten the barrier line 109 to a terminating point on the marine object. In this specification, marine object refers to any object that encounters the water, such as powerboats, sailboats, buoys, swim platforms, life rafts, submarines, and the like. The barrier line retainer 111 may, in some embodiments of the present invention, be made from a plastic, a metal, or a composite, and may contain a mechanism to securely retain one end of the barrier line 109. The barrier line retainer 111, in other embodiments of the present invention, may be an eyelet, a snap, a clip, a clasp, or the like. The barrier line retainer 111 may, in some embodiments of the present invention, include a swivel mechanism to prevent the barrier line 109 from becoming twisted, entangled, or otherwise snarled.

Figure 2:
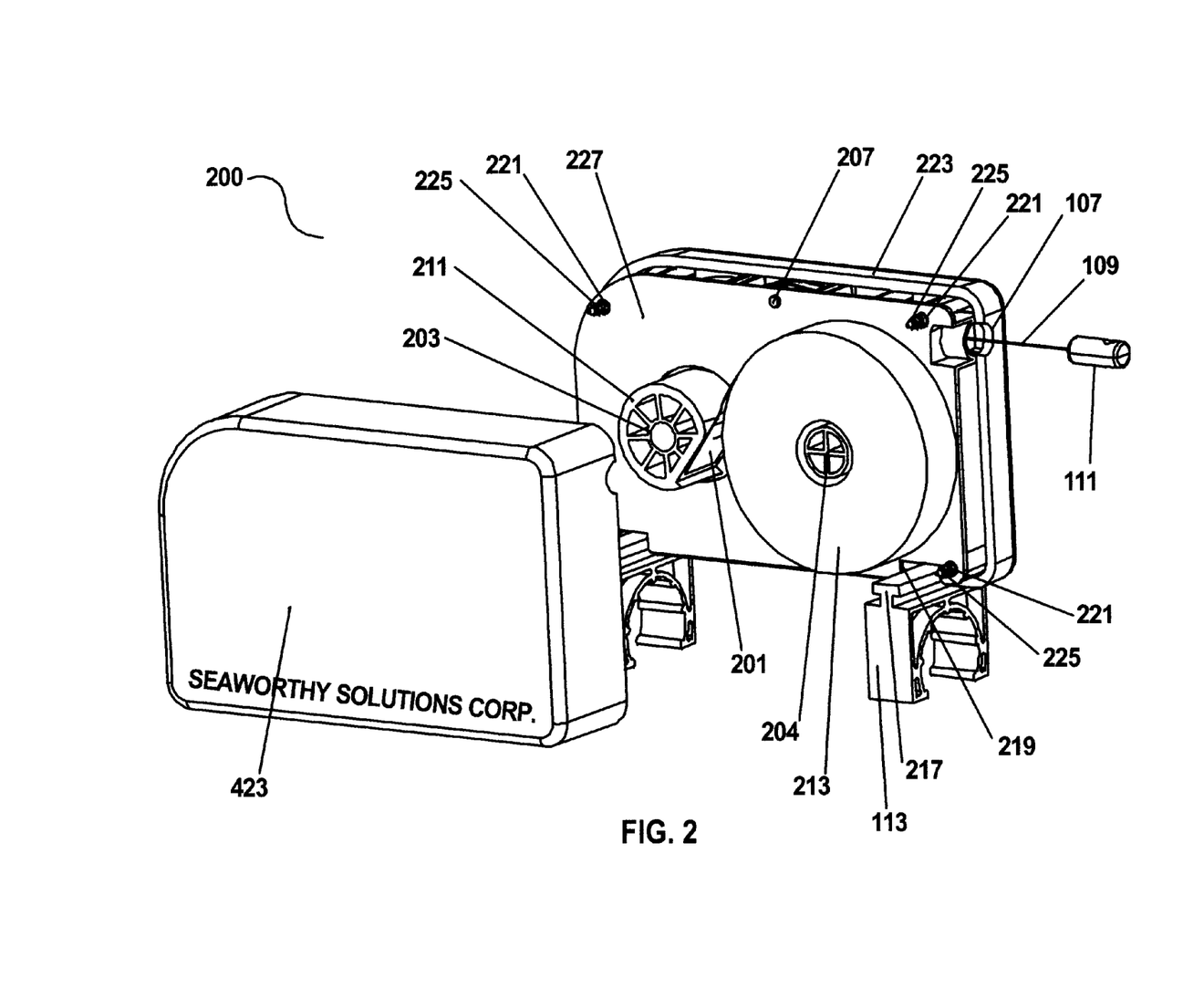
FIG. 2 is a perspective view of a line retractor with the first side removed.

Referring now to FIG. 2, a perspective view of a line retractor with the first side removed (200) is shown. With the first side removed, one side of the internal mechanism of the line retractor can be seen. One spool is used to facilitate the extension and retraction of the barrier line 109. A line spool 209 (not shown in FIG. 2, refer to FIG. 4 and the accompanying description) retains the barrier line 109. The line retractor spring coil 213 is a constant force spring which is used to provide the mechanical energy storage required to maintain tension on the barrier line 109 and to assist in the retraction of the barrier line 109. Other embodiments of the present invention may use springs known to those skilled in the art without departing from the spirit and scope of the present invention. The line spool 209 may be made from a plastic, a metal, or a composite. The line spool 209 and the line retractor spring coil 213 interact by way of a hub 211 that is attached to the line spool 209, and in some embodiments of the present invention, is made from the same material as the line spool 209. The hub 211 retains one end 201 of the line retractor spring coil 213 such that as the barrier line 109 is extended and thus rotationally removed from the line spool 209, the line retractor spring coil 213 is wound about the hub 211 in a direction opposite to the pre-stressed curvature of the line retractor spring coil 213, storing energy from the extension of the barrier line within the line retractor spring coil 213 that may be used at another time to assist with the retraction of said barrier line. The line retractor spring coil 213 may be made of coiled spring steel, plastic, stainless steel, or the like. The line retractor spring coil 213 is wound with sufficient tension to allow the barrier line 109 to be deployed with moderate tension, preventing tangles and knots in the barrier line 109. Once the barrier line 109 is deployed, the line retractor spring coil 213 maintains tension on the barrier line 109. The line retractor spring coil 213 also provides for mechanical energy storage sufficient to allow the barrier line 109 to be retracted and wound on the line spool 209. The line spool 209 is retained about a rotational axis using a spindle arrangement that contains a first line spool spindle 203 and a second line spool spindle. The line retractor spring coil 213 is retained about a rotational axis using a spring coil spindle 204. The first line spool spindle 203 is attached at one end to the first side 223, and, in some embodiments of the present invention, may be made from the same material as the first side 223. A second line spool spindle (not shown) is attached at one end to the second side 423, and, in some embodiments of the present invention, may be made of the same material as the second side 423. The spring coil spindle 204 is attached at one end to the inner wall 227, and, in some embodiments of the present invention, may be made from the same material as the inner wall 227. Materials that can be used for the first side include plastics, metals, composites, and the like. To provide rigidity to the overall assemblage of parts, and to ensure that the line retractor spring coil 213 and the line spool 209 maintain the alignment needed for proper functioning, an inner wall 227 is used. The inner wall 227 may be made from a plastic, a metal, or a composite. The first side 223 contains screw guide holes 221 within which screws 225 are placed. The screws 225 are fastened into the second side 423 once the line retractor spring coil 213 and the line spool 209 are placed on their corresponding spindles with the barrier line 109 in place, and each T fitting 217 that is fastened to or a part of the rail clamp 113 is located in a T slot 219. The second side 423 may, in some embodiments of the present invention, contain advertising, such as the name of the manufacturer of the bird deterrent apparatus.

Figure 3:
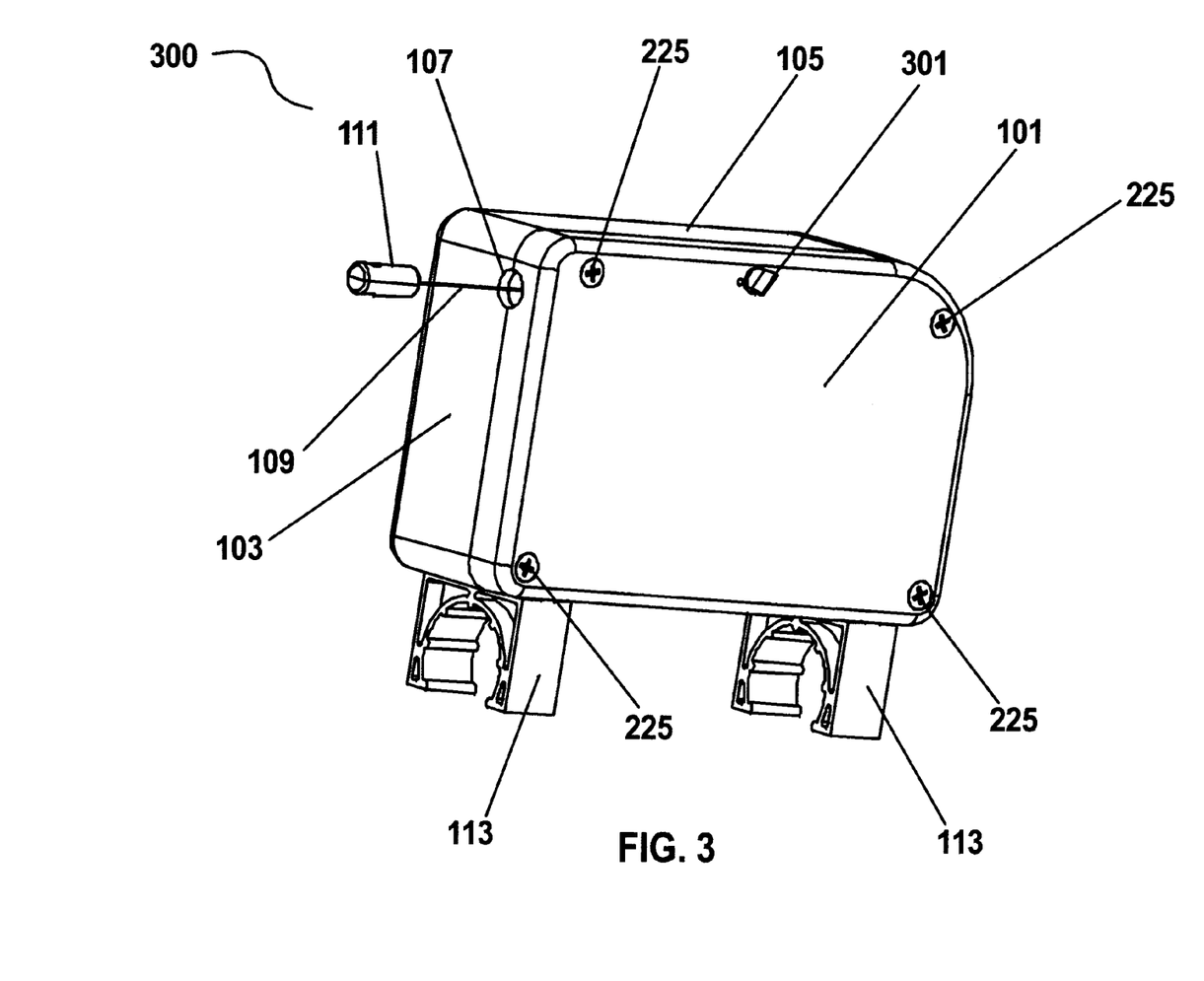
FIG. 3 is a perspective view from the second side of a line retractor.

FIG. 3 represents a perspective view from the second side of a line retractor of the bird deterring apparatus according to one embodiment of the present invention. The barrier line 109 is shown partially extended for clarity in illustration. A brake adjustor 301 is shown protruding through a hole in the faceplate side 101. The brake adjustor 301 is attached to the brake 205 that is housed within the line retractor 100, and is used to enable or disable the functioning of the brake 205, as will be further explained by way of FIG. 4 and the associated description to follow.

Figure 4:
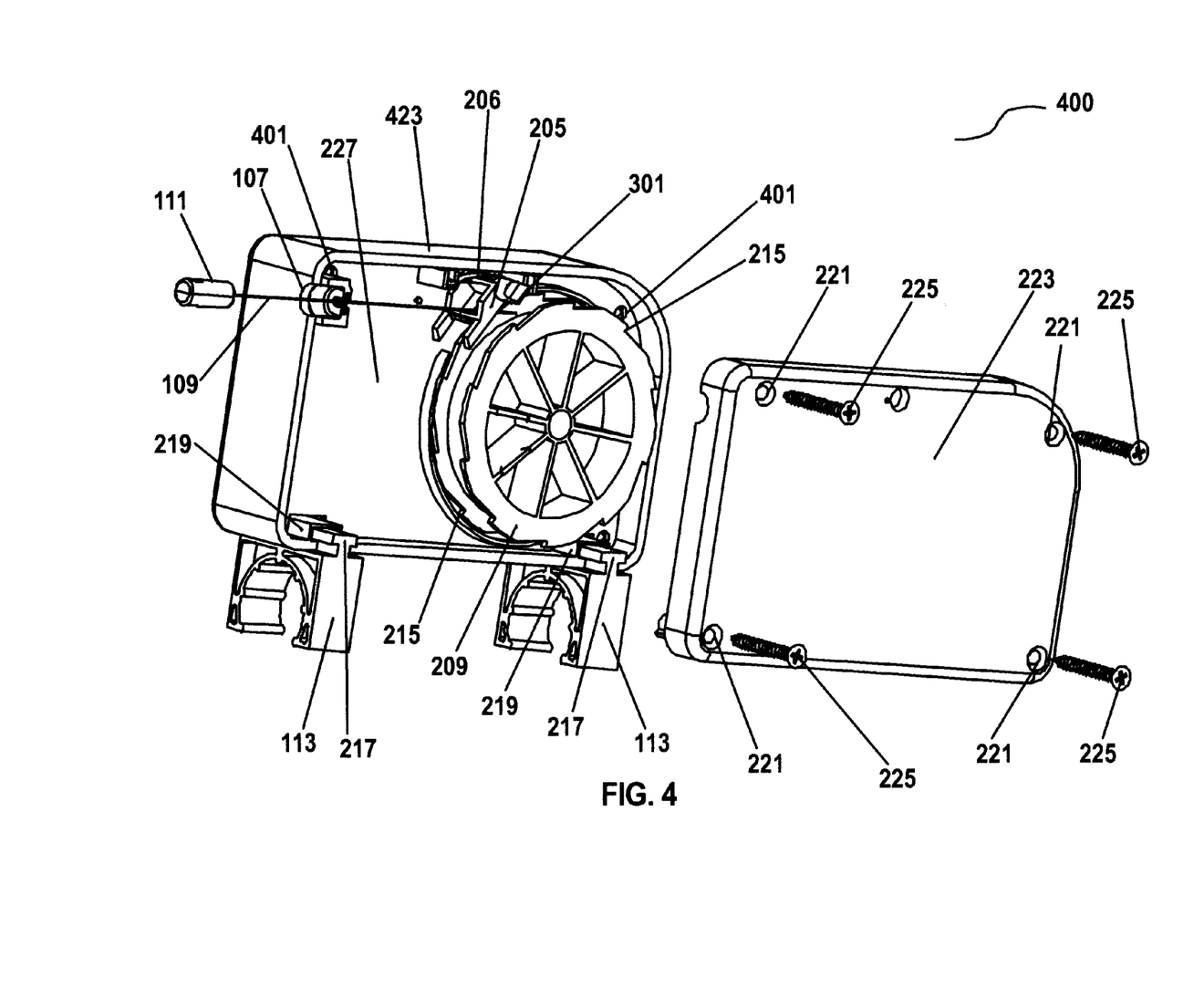
FIG. 4 is a perspective view of a line retractor with the second side removed.

Now turning to FIG. 4, a perspective view of a line retractor with the second side removed is depicted. FIG. 4 shows the opposing side of the internal mechanism depicted in FIG. 2. The first side 223 as shown in FIGS. 4 and 2 includes the faceplate side 101, the perimeter side 103 and the top side 105, as illustrated in FIG. 1 and FIG. 3. The first side 223 mates to the second side 423 using, in some embodiments of the present invention, screws 225 that pass through screw guide holes 221 and enter screw holes 401. FIG. 4 also provides a view of the line spool 209 that uses a series of locking edges 215 to engage the brake 205 in the event of a sudden barrier line release during deployment or removal. The sudden release of a barrier line without a brake could potentially strike a person, pet or an object with a rapidly accelerating barrier line retainer 111. The brake 205 makes use of a safety spring 206 that serves to engage the brake 205 in a locking edge 215 and thus halt the angular velocity of the line spool 209 in the event of a barrier line release. Once the barrier line 109 is deployed, the brake adjustor 301 may be moved so as to disable the brake operation. Disabling the brake in this manner prevents unintended engagement of the brake 205 with the locking edges 215 should an object or bird impact or bounce off the barrier line 109.

In use, the barrier line 109 may be deployed in shorter lengths, such as lengths of under ten feet to protect designated areas of marine objects. The barrier line 109 may also be deployed in longer lengths, such as lengths in excess of ten feet, and may be deployed in lengths of up to eighty feet or more. To use longer line lengths and to follow the contours of the areas to be protected, the barrier line 109 may require intermediary guide structures to ensure that the barrier line 109 is held in place and does not sag or move. An example of such an application is a sailboat lifeline and rail assembly. Birds often times perch on the lifelines of a sailboat, leaving droppings on the deck and lifelines that are undesirable.

Figure 7:
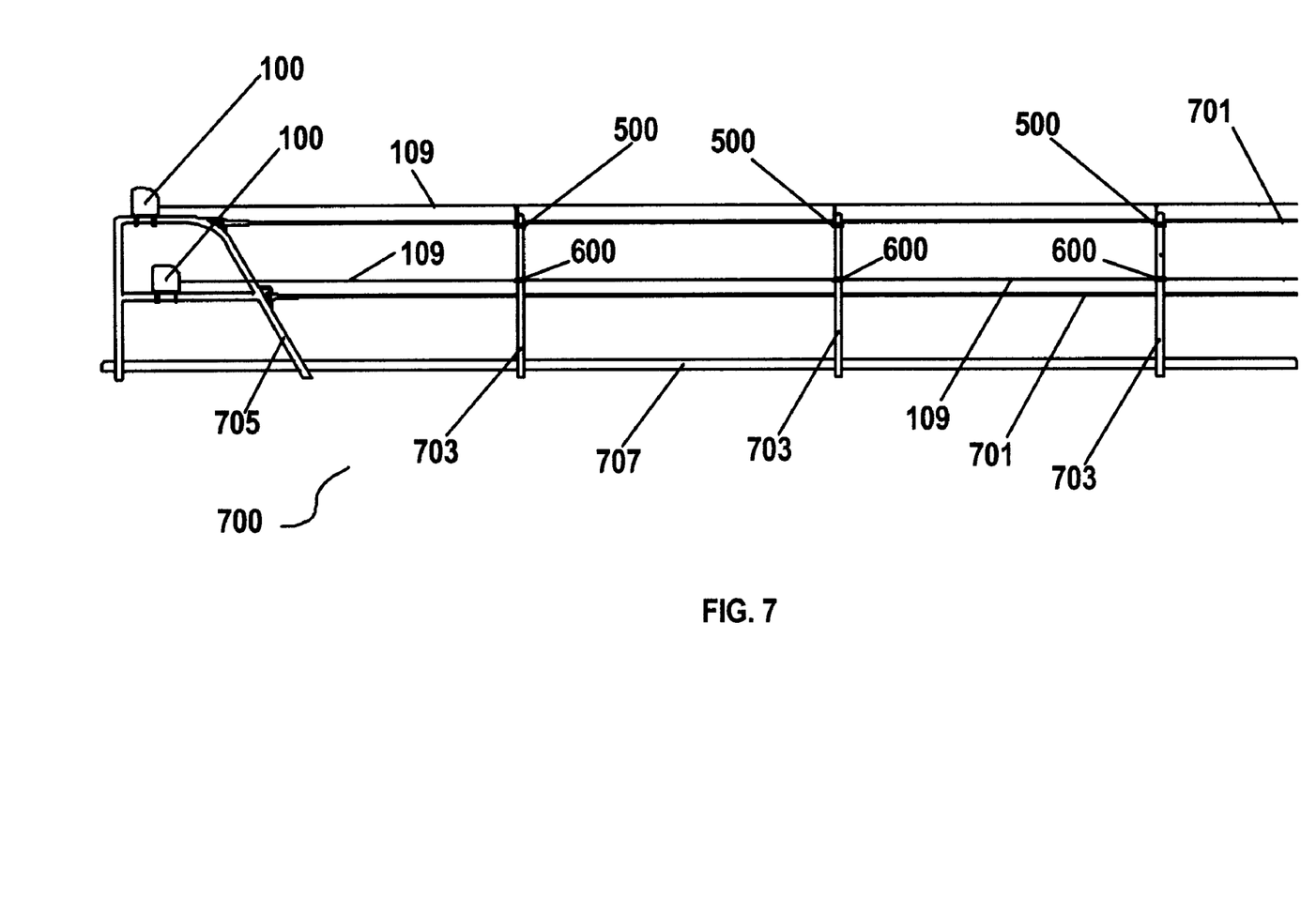
FIG. 7 illustrates the use of a bird deterring apparatus on a sailboat rail and lifeline assembly.

Moving ahead, FIG. 7 shows the application of a bird deterrent apparatus of the present invention on a sailboat lifeline and rail assembly 700. The sailboat lifeline and rail assembly is typically located along the perimeter of a sailboat. Vertical supports known as stanchions 703 are used to hold the lifelines 701 in place. In many sailboats, there is a lower lifeline and an upper lifeline. The sailboat lifeline and rail assembly 700 also may contain a stem rail 705 to retain one end of each lifeline 701. A deck toe rail 707 may also be present. In use, the line retractor 100 is mounted to a support structure such as a stem rail 705 on a sailboat lifeline and rail assembly 700. The barrier line 109 is mounted in a horizontal position in close proximity above each lifeline 701. The barrier line 109 serves as both a visual and a physical deterrent to birds. The small diameter of the barrier line 109 prevents birds from perching on said barrier line 109. In addition, the placement of the barrier line 109 in close proximity above the object to be protected, such as a sailboat lifeline 701, serves as a physical deterrent to prospective perching birds. The thin and sometimes opaque barrier line 109 is visible to birds, but may also serve to confuse and distress birds that observe the barrier line 109 in close proximity to a potential perching location, thus deterring the birds from landing. To provide adequate support for the barrier line 109 above said lifeline 701, and to insure the barrier line 109 follows the contour and path of the lifeline 701, barrier line guides may be used.

Figure 5:
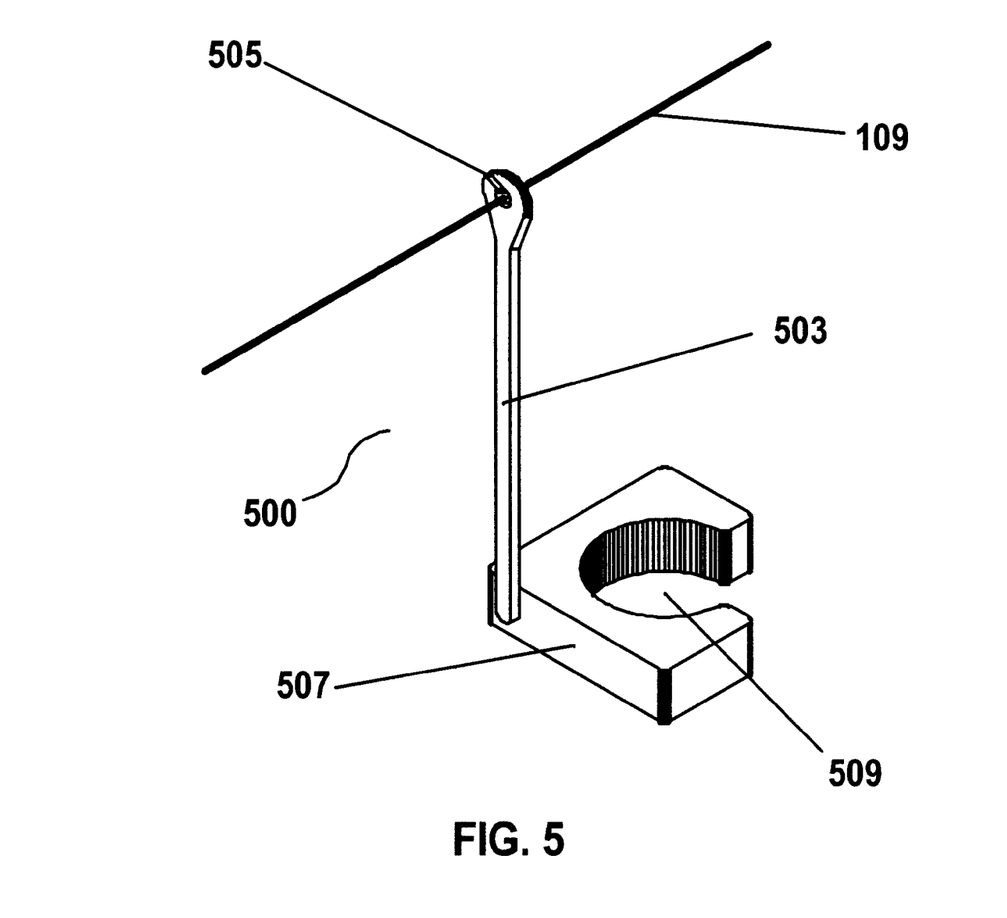
FIG. 5 is a perspective view of an upper barrier line guide assembly that may be used with the line retractor.

FIG. 5 shows an upper barrier line guide assembly 500 according to one embodiment of the present invention. The upper barrier line guide assembly 500 allows for placement of a barrier line 501 in close proximity above an area to be protected from perching birds, such as an upper life line area of a sailboat. The upper barrier line guide assembly 500 mounts to a structural element such as a stanchion 703 using a clamp such as an upper barrier line guide stanchion clamp 507. The upper barrier line guide stanchion clamp 507 may contain an interior 509 that is shaped to accommodate the vertical support structure. The upper barrier line guide stanchion clamp may also contain a tightening means for improved retention on a vertical support structure. Attached to the upper barrier line guide stanchion clamp 507 is an upper barrier line guide 503 that contains an eyelet 505. The barrier line 109 is retained by the eyelet 505, providing support and stabilization of the barrier line. The upper barrier line guide 503 places the barrier line 109 in close proximity above an an area to be protected, such as the upper lifeline area of a sailboat, thus protecting the upper lifeline from perching birds and their associated debris.

Figure 6:
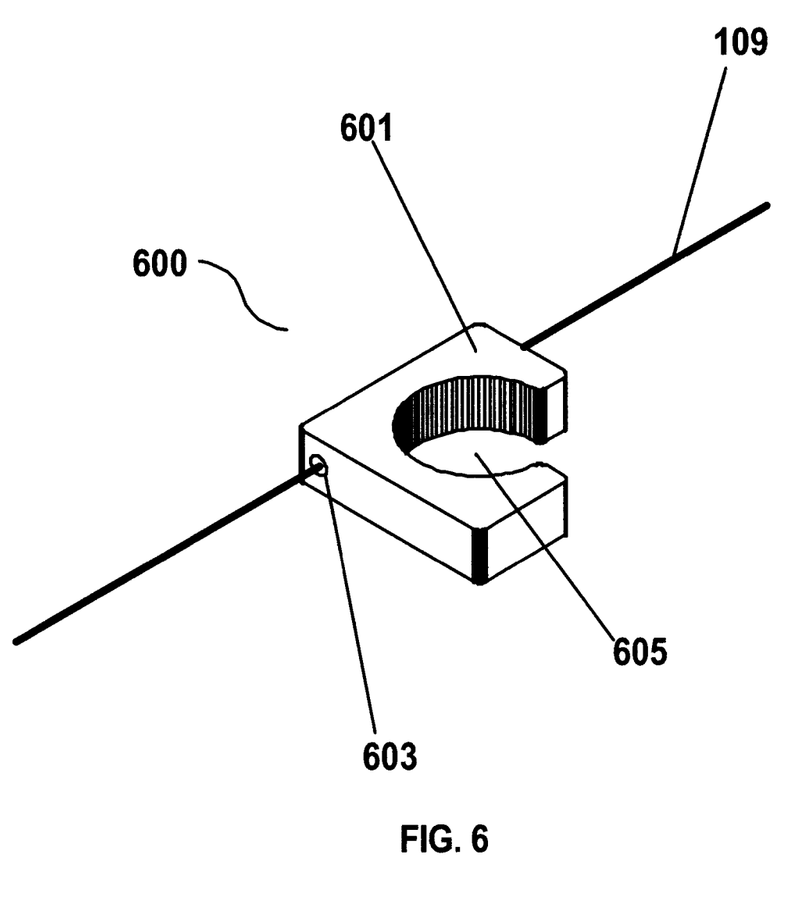
FIG. 6 is a perspective view of a lower barrier line guide assembly that may be used with the line retractor.

FIG. 6 shows a lower barrier line guide assembly 600 according to one embodiment of the present invention. To protect an area such as the lower lifeline area of a sailboat from perching birds, a barrier line 109 is placed in close proximity above the area to be protected from perching birds. The lower barrier line guide assembly 600 provides support for a barrier line 109 in close proximity above the area to be protected from perching birds by attaching to a structural element with a clamp such as a lower barrier line guide stanchion clamp 601. A lower barrier line guide 603 may, in one embodiment of the present invention, be a hole placed in the lower barrier line guide stanchion clamp 601 in such a way that the barrier line 109 travels freely through the lower barrier line guide 603. The lower barrier stanchion clamp 601 may contain an interior 605 that is shaped to accommodate the vertical support structure. The lower barrier line guide stanchion clamp 601 may also contain a tightening means for improved retention on a vertical support structure.

Figure 8:
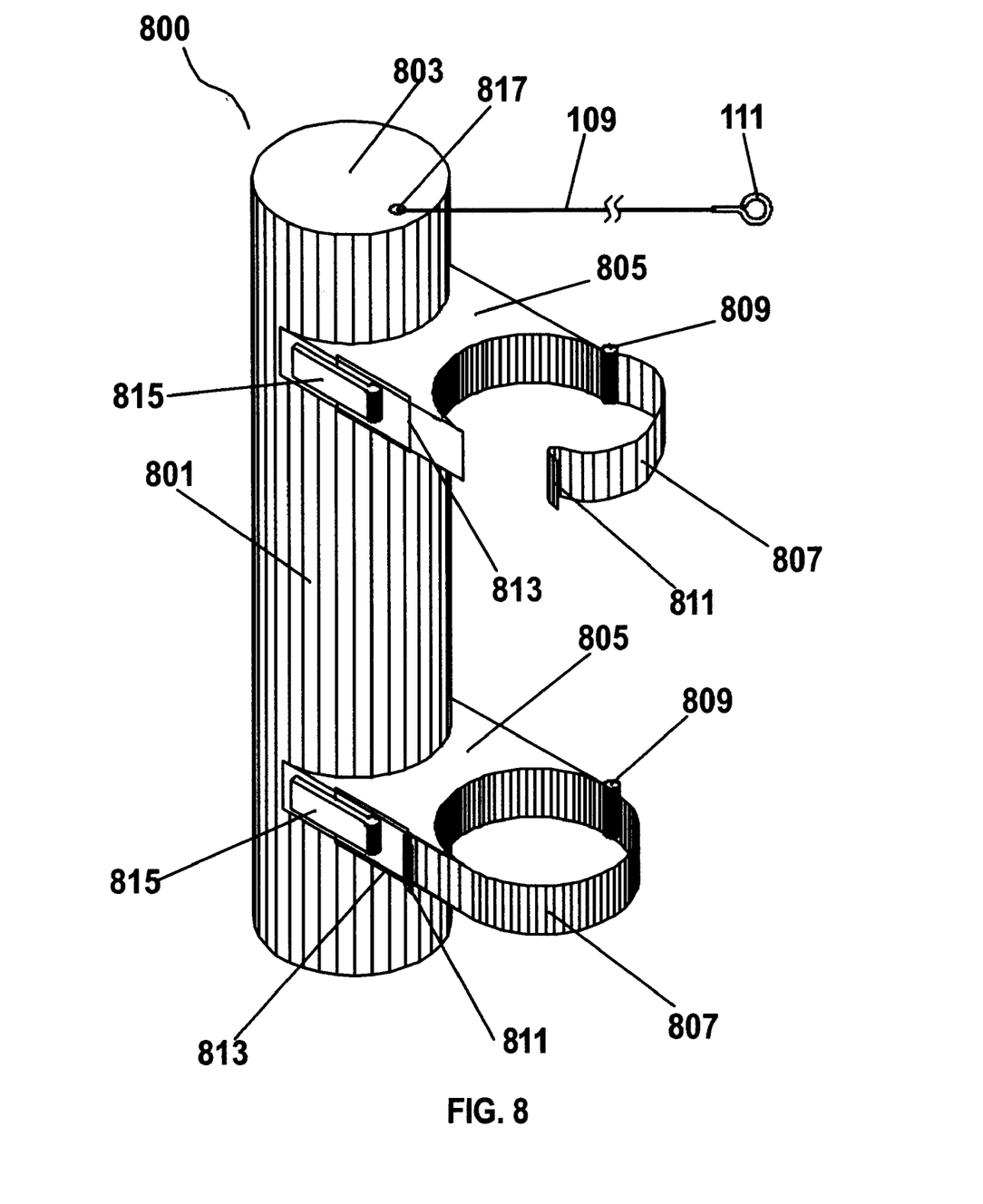
FIG. 8 is a perspective view of a tubular line retractor according to another embodiment of the present invention.

Referring now to FIG. 8, a tubular line retractor of the bird deterrent apparatus according to another embodiment of the present invention is shown. FIG. 8 shows a tubular line retractor 800 that is mounted parallel to a stanchion, rail or other support on the floating vessel. The tubular line retractor 800 is made of a cylindrical body 801 that may be made of stainless steel, plastic, brass, or the like. The cylindrical body 801 contains two end caps 803 that seal the internal mechanism from the elements. The tubular line retractor 800 is fastened to a stanchion, rail or other support using a rail clamp 805. The rail clamp 805 may contain a strap 807, a hinge 809, a flare 811, a loop 813, and a lever 815. The rail clamp 805 allows for easy placement and removal of the tubular line retractor 800. In use, the barrier line 109 exits a barrier line guide hole 817 and may be fastened to a terminating point on the floating vessel using a barrier line retainer 111.

Figure 9:
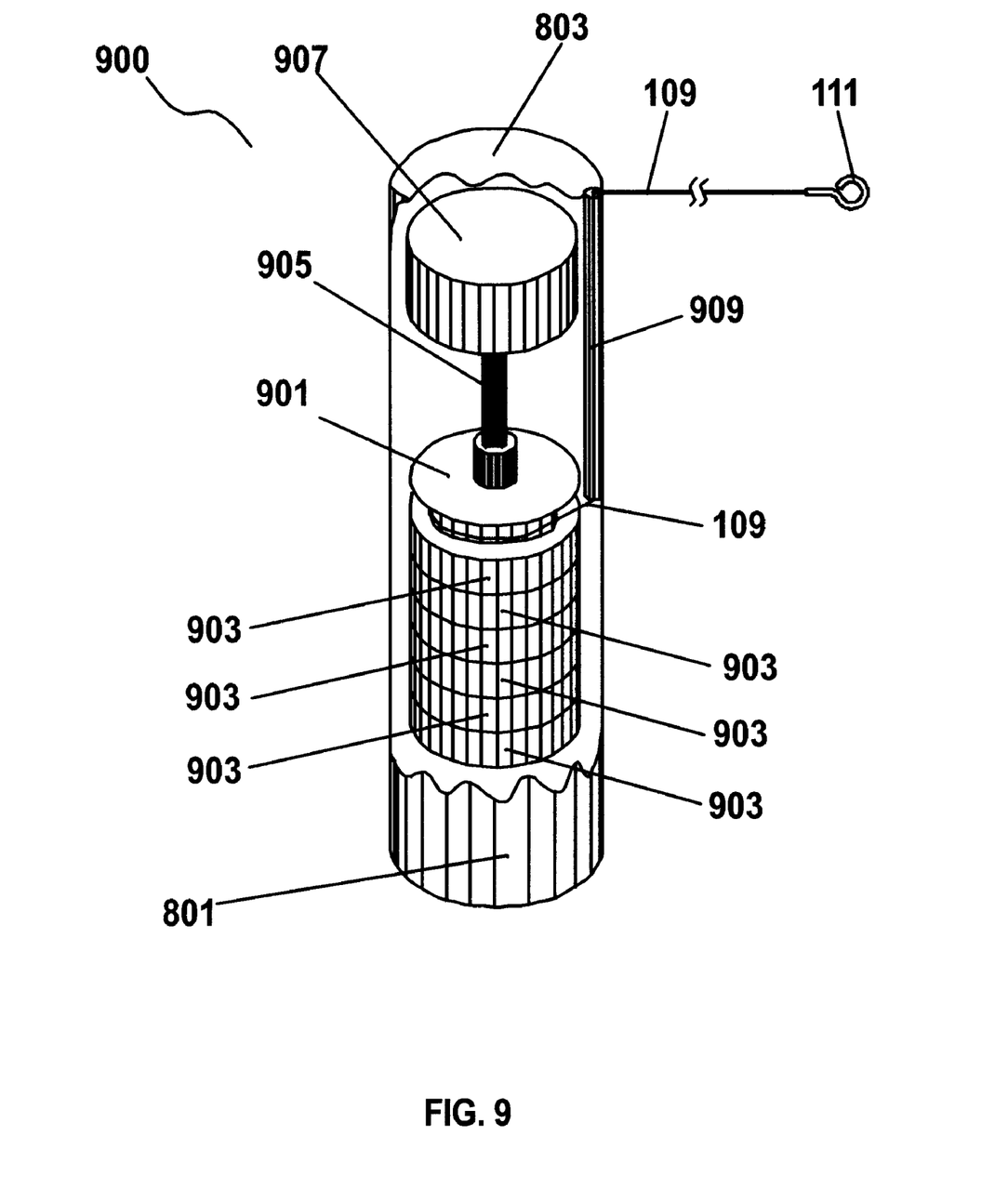
FIG. 9 is a cutaway view of a tubular line retractor.

FIG. 9 is a cutaway view of a tubular line retractor 900 showing the internal mechanism of the tubular line retractor 900. A spool 901 carries and retains the barrier line 109. The barrier line 109 travels from the spool 901 through an interior barrier line guide 909 and exits from the tubular line retractor 900. The spool 901 is mechanically connected to at least one spring retention shell 903. The spring retention shell 903 contains a spring (not shown in FIG. 9, refer to FIG. 10) to assist in winding and unwinding the barrier line 109 about the spool 901. The spool 901 is connected to a shaft 905 that may be connected to a brake 907 that will reduce the angular velocity of the spool 901 such that the barrier line 109 is retracted with a linear velocity that is low enough to prevent barrier line breakage and to maintain a safe working environment.

Figure 10:
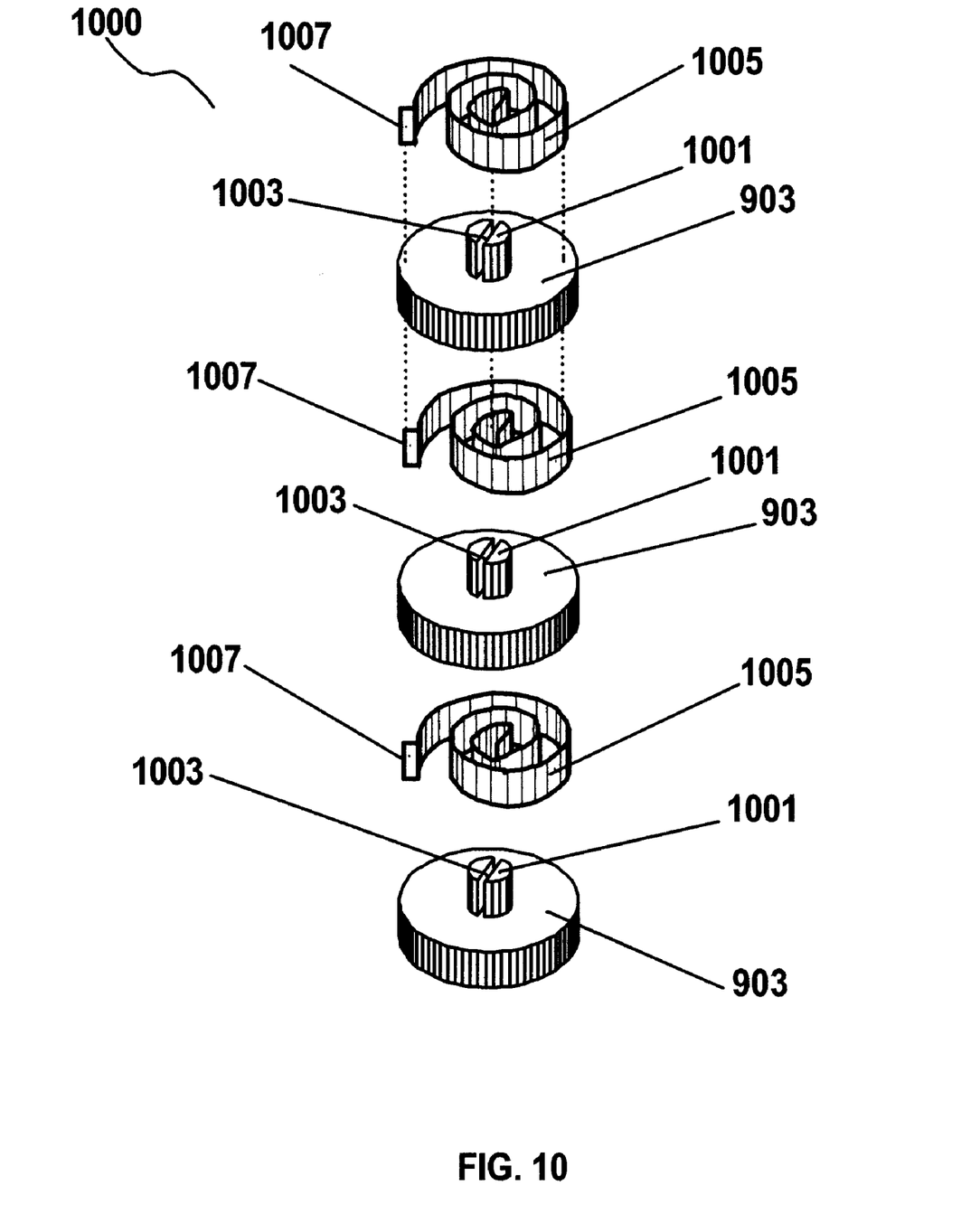
FIG. 10 is an exploded view of a stacking spring assembly contained in the tubular line retractor.

FIG. 10 is an exploded view of a stacking spring assembly 1000 that is used to maintain tension on the barrier line 109. The stacking spring assembly 1000 contains at least one spring retention shell 903 that retains a spring 1005. The spring 1005 is held in place at one end by a spring retention spindle 1001 that may further contain a slot 1003. The spring is further retained by a spring terminating end 1007 that engages with an interior point of the spring retention shell 903.

To use the bird deterrent apparatus of the present invention, the line retractor 100, or in another embodiment of the present invention, the tubular line retractor 800, is mounted to an originating point. The barrier line 109 is deployed from the line retractor 100 until such time as an adequate terminating point is reached. The barrier line 109 is attached to the terminating point using a barrier line retainer 111. The area below the extended barrier line 109 from the originating point to the termination point of the barrier line is protected from perching birds and their associated debris. In one embodiment of the present invention, the barrier line 109 is maintained in close proximity above the surface that is to be protected from perching birds. An upper barrier line guide assembly 500 and a lower barrier line guide assembly may be used to support the barrier line 109.

It is, therefore, apparent that there has been provided, in accordance with the various objects of the present invention, an apparatus for deterring birds from landing. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, drawings, and the appended claims.

What is claimed is:

1. A bird deterrent apparatus comprising:
a barrier line that in use is suspended above an object to be protected from perching birds and their associated debris, the barrier line serving to confuse, alarm and physically deter birds from perching;
a barrier line retainer attached to one end of said barrier line for quick attachment and detachment of said barrier line;
a line retractor having sides that enclose an internal line spool for storing and delivering said barrier line through a barrier line guide hole, the internal line spool having a spring and a brake for safely tensioning and retracting said barrier line, said spring and said brake operatively connected to said internal line spool;
a c-shaped rail clamp attached to said line retractor for ease of mounting and demounting said line retractor on a structural element of the object to be protected;
wherein said c-shaped rail clamp is further attached to said line retractor at a point that is below and perpendicular to said barrier line guide hole and an upper barrier line guide assembly for retaining and guiding said barrier line while said barrier line is in use, the upper barrier line guide assembly having an upper barrier line guide stanchion clamp containing an interior that is shaped to accommodate the vertical support structure and an upper barrier line guide containing an eyelet, wherein said barrier line is retained by the eyelet.

2. The apparatus as recited in claim 1, further comprising a brake connected to said line retractor for ensuring that said barrier line is not suddenly retracted with unnecessary force.

3. The apparatus as recited in claim 1, wherein said line retractor is rectangular.

4. The apparatus as recited in claim 1, wherein said line retractor is cylindrical.

5. The apparatus as recited in claim 1, wherein said barrier line is a monofilament.

6. The apparatus as recited in claim 1, wherein said barrier line is wire.

7. The apparatus as recited in claim 1, wherein said barrier line is made from gel spun polyethylene fibers.

8. The apparatus as recited in claim 1, wherein said barrier line is made from nylon.

9. The apparatus as recited in claim 1, wherein said barrier line guide hole is no more than ten inches from said c-shaped rail clamp.

10. The apparatus as recited in claim 1, wherein said barrier line has a circular cross section.

* * * * *